(12) United States Patent
Råhlin

(10) Patent No.: US 10,005,030 B2
(45) Date of Patent: Jun. 26, 2018

(54) FLUE GAS TREATMENT SYSTEM AND METHOD

(71) Applicant: ALSTOM Technology Ltd, Baden (CH)

(72) Inventor: Robert Råhlin, Växjö (SE)

(73) Assignee: GENERAL ELECTRIC TECHNOLOGY GMBH, Baden (CH)

( * ) Notice: Subject to any disclaimer, the term of this patent is extended or adjusted under 35 U.S.C. 154(b) by 171 days.

(21) Appl. No.: 15/014,190

(22) Filed: Feb. 3, 2016

(65) Prior Publication Data

US 2016/0236144 A1  Aug. 18, 2016

(30) Foreign Application Priority Data

Feb. 17, 2015 (EP) .................. 15155324

(51) Int. Cl.

| | | |
|---|---|---|
| *F01N 3/10* | (2006.01) | |
| *B01D 53/83* | (2006.01) | |
| *B01D 45/16* | (2006.01) | |
| *B01D 53/50* | (2006.01) | |
| *B01D 53/68* | (2006.01) | |
| *B01D 53/96* | (2006.01) | |

(Continued)

(52) U.S. Cl.
CPC ............ *B01D 53/83* (2013.01); *B01D 45/16* (2013.01); *B01D 53/508* (2013.01); *B01D 53/685* (2013.01); *B01D 53/96* (2013.01); *F23J 15/022* (2013.01); *F23J 15/04* (2013.01); *B01D 53/346* (2013.01); *B01D 2251/404* (2013.01); *B01D 2251/604* (2013.01); *B01D 2257/2045* (2013.01); *B01D 2257/302* (2013.01); *B01D 2258/0291* (2013.01); *F23J 2215/20* (2013.01); *F23J 2215/30* (2013.01); *F23J 2217/101* (2013.01); *F23J 2217/40* (2013.01); *F23J 2219/20* (2013.01)

(58) Field of Classification Search
CPC ........ F23J 15/022; F23J 15/04; F23J 2215/20; F23J 2215/30; B01D 53/508; B01D 45/16; B01D 53/96
USPC .................... 422/168; 96/108, 121, 143, 120
See application file for complete search history.

(56) References Cited

U.S. PATENT DOCUMENTS 4,956,162 A * 9/1990 Smith .................. B01D 53/508
  423/215.5
7,850,936 B2  12/2010 Levasseur et al.
(Continued)

FOREIGN PATENT DOCUMENTS

CN  101 670 237 A1  3/2010
DE  44 15 719 A1  11/1995
(Continued)

OTHER PUBLICATIONS

EP Application No. 14187641.7 filed Oct. 3, 2014 entitled "Dust Separator Useful with Dry Scrubber System".

*Primary Examiner* — Tom P Duong
(74) *Attorney, Agent, or Firm* — GE Global Patent Operation; Rita D. Vacca

(57) ABSTRACT

The flue gas treatment system (1) comprises a reactor (2), a pre-separator (3) downstream of the reactor (2), a separator (4) such as a fabric filter downstream of the pre-separator (3), a humidifier (5) downstream of the separator (4), a supply (7) of a pure fresh reagent into the flue gas (FG) downstream of the pre-separator (3) and upstream of or at the separator (4).

15 Claims, 1 Drawing Sheet

(51) Int. Cl.
  *F23J 15/02*  (2006.01)
  *F23J 15/04*  (2006.01)
  *B01D 53/34*  (2006.01)

(56) References Cited

U.S. PATENT DOCUMENTS

| | | | | |
|---|---|---|---|---|
| 8,906,333 | B1* | 12/2014 | Appelo | B01D 53/83 422/168 |
| 2006/0228281 | A1* | 10/2006 | Stroder | B01D 53/12 423/212 |

FOREIGN PATENT DOCUMENTS

| | | |
|---|---|---|
| DE | 195 17 863 A1 | 11/1996 |
| EP | 1 815 903 A1 | 8/2007 |
| KR | 101 464 112 B1 | 11/2014 |
| WO | 2004/056452 A1 | 7/2004 |

\* cited by examiner

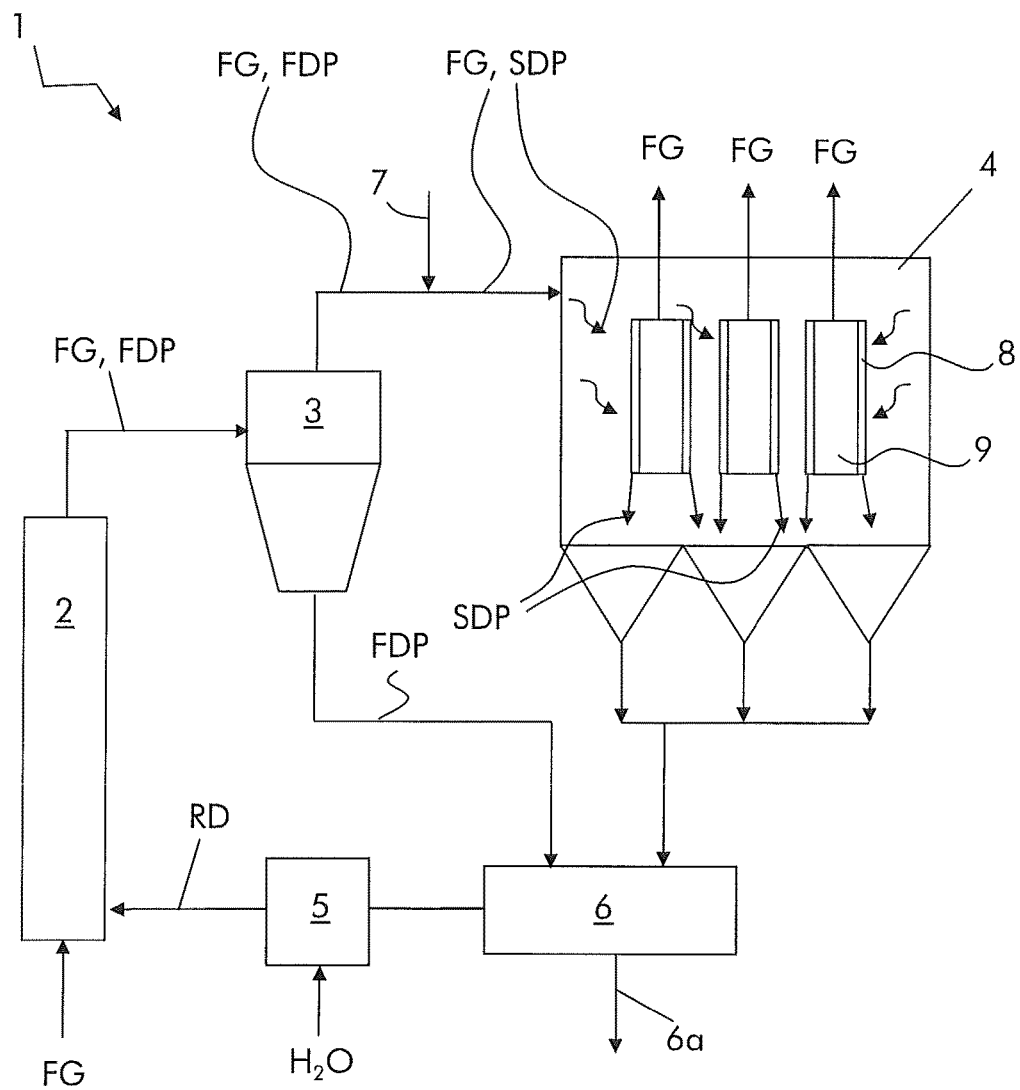

FLUE GAS TREATMENT SYSTEM AND METHOD

CROSS-REFERENCE TO RELATED APPLICATIONS

This application claims priority to European Application No. 15155324.5, filed Feb. 17, 2015, the contents of which are hereby incorporated in its entirety.

TECHNICAL FIELD

The present invention relates to a flue gas treatment system and method. In particular the present system and method are adapted to treat flue gas containing $SO_2$ and HCl; gas containing $SO_2$ and HCl can for example derive from the combustion of different fuels, such as coal or others, but typically it is generated by the combustion of waste material.

BACKGROUND

U.S. Pat. No. 7,850,936 discloses a system for removing $SO_2$ from a flue gas with high efficiency having a reactor in which the $SO_2$ contained in the flue gas is reacted with a reagent forming dust products, a separator where the dust products are removed from the flue gas and a humidifier where the dust products are humidified and forwarded back into the reactor. In order to obtain high $SO_2$ removal efficiency, U.S. Pat. No. 7,850,936 proposes to increase the humidification rate and, in order to avoid bag binding, cold spot condensation and other problems, U.S. Pat. No. 7,850,936 proposes to install a pre-separator between the reactor and the separator, in order to remove a part of the dust from the flue gas and send the removed dust to the humidifier and thus into the reactor. The flue gas is forwarded to the separator where the remaining dust is removed and sent to the humidifier and then into the reactor as well. According to U.S. Pat. No. 7,850,936 fresh reagent is supplied into the humidified dust that is forwarded into the reactor. U.S. Pat. No. 7,850,936 specifically refers to removal of $SO_2$, but it does not consider efficient removal of other components that could be contained in the flue gas, such as HCl.

EP 14187641.7 discloses a system for removal of components such as $SO_2$ and HCl from a flue gas. EP 14187641.7 discloses a reactor for reacting components such as $SO_2$ and HCl with a reagent forming dust products, a pre-separator downstream of the reactor for removing a part of the dust products, a separator downstream of the pre-separator for removing the remainder of the dust product from the flue gas. Fresh reagent is fed into the part of the dust products and the remainder of the dust products and the resulting dust products are humidified and supplied into the reactor. In addition, humidified dust products can also be supplied at a position between the pre-separator and the separator. According to EP 14187641.7 the most of the reagent (contained in the humidified dust products) is supplied into the reactor, while the reagent eventually supplied downstream of the pre-separator is a minor amount and is diluted in the humidified dust products. In the system of EP 14187641.7 the reactions occur to a higher degree (even if not only) in the reactor, because in the reactor the amount of fresh reagent allows a high reaction rate, while in the parts of the system different from the reactor the components in the dust that take part in the reactions are diluted by the components that do not take part in the reactions such that reactions cannot significantly develop.

SUMMARY

An aspect of the invention includes providing a system and a method in which not only $SO_2$, but also other components such as HCl are removed from a flue gas and in which such a removal is efficient.

These and further aspects are attained by providing a system and a method in accordance with the accompanying claims.

Injection of pure fresh reagent downstream of the pre-separator allows a dust with a high percentage of fresh reagent to build a dust cake with high amount of reagent (e.g. fresh lime) on the filter bag in the separator (e.g. fabric filter); this makes the dust stay in the separator, for the reactions to develop to a large degree also at the separator, taking advantage of the dust residence time on the filter bag in the dust cake.

Therefore, the reactions taking place in particular in the separator are improved.

In one embodiment, the total amount of HCl and/or $SO_2$ removed in the system in embodiments of the invention can be higher than in the systems of the prior art.

Pure reagent is a reagent that is not mixed with the first and/or second dust products.

BRIEF DESCRIPTION OF THE DRAWINGS

Further characteristics and advantages will be more apparent from the description of a preferred but non-exclusive embodiment of the system and method, illustrated by way of non-limiting example in the accompanying drawings, in which:

FIG. 1 shows an embodiment of the system of the invention; in this FIGURE the indications FG, FDP, SDP indicate the flue gas FG and the kind of dust (FDP or SDP) contained in it.

DETAILED DESCRIPTION

In the following the flue gas treatment system 1 for treating a flue gas containing HCl and $SO_2$ is described first.

The system 1 comprises:

a reactor 2 for reacting at least a part of HCl and/or $SO_2$ contained in the flue gas FG with a reactive dust RD forming first dust products FDP, a pre-separator 3 downstream of the reactor 2, for removing a part of the first dust products FDP from the flue gas FG and forwarding the flue gas containing a remainder of the first dust products to a separator 4, the separator 4 that is preferably a fabric filter, downstream of the pre-separator 3, for further reacting the HCl and/or $SO_2$ contained in the flue gas FG to contribute to form second dust products SDP and for removing a second dust products SDP from the flue gas FG, a humidifier 5 downstream of the separator 4 for humidifying at least the second dust products forming the reactive dust RD and supplying the reactive dust RD to the reactor 2. The humidifier 5 has a water supply and preferably it also comprises a mixing device or a mixing tool to mix the dust with the water.

Preferably a collector 6 is provided to receive the part of the first dust removed at the pre-separator 3 and the second dust products from the separator 4; the collector 6 can for example be a hopper. The collector 6 (when present) is connected to and supplies a dust mixture comprised of the first dust products and second dust products to the humidifier 5. In addition, the collector 6 has a discharge 6a to remove a part of the dust mixture and discharge it.

In addition, the system further has a supply 7 of a pure fresh reagent (such as Ca(OH)$_2$ or others) into the flue gas FG to contribute to form the second dust products; in one embodiment the supply 7 is only provided downstream of the m pre-separator 3 and upstream of or at the fabric filter 4. Alternatively fresh reagent can also be supplied into the humidifier 5 or other parts of the system.

The pre-separator 3 is configured to remove from the flue gas between 50-99% by weight and preferably 70-99% by weight of the first dust products and can be a cyclone, i.e. a device in which the dust is separated from the flue gas by centrifugal forces; for example a kind of cyclone used as the pre-separator 3 can be the dust separator described in EP 14187641.7. The pre-separator can be an independent device as shown in FIG. 1 and also described in U.S. Pat. No. 7,850,936, or it can be integrated at the end of the reactor, as for example described in EP 14187641.7.

The operation of the system is apparent from that described and illustrated and is substantially the following. In the following reference to Ca(OH)$_2$ as the fresh reagent is made.

Flue gas FG containing inter alia SO$_2$ and HCl (together with e.g. CO$_2$ and H$_2$O) is supplied into the reactor 2; reactive dust from the humidifier 5 containing Ca(OH)$_2$ (together with e.g. CaOHCl, CaCl$_2$, fly ash, etc) is supplied into the reactor 2 as well.

In the reactor 2 HCl and SO$_2$ react, e.g. according to the equilibriums $$Ca(OH)_2 + CO_2 \leftrightarrow CaCO_3 + H_2O \quad [1]$$

$$Ca(OH)_2 + 2HCl \leftrightarrow CaCl_2 \cdot 2H_2O \quad [2]$$

$$Ca(OH)_2 + 2HCl \leftrightarrow CaCl_2 + 2H_2O \quad [3]$$

$$Ca(OH)_2 + SO_2 \leftrightarrow CaSO_3 + H_2O \quad [4]$$

$$CaCl_2 + H_2O + CO_2 \leftrightarrow CaCO_3 + 2HCl \quad [5]$$

$$CaCl_2 \cdot H_2O + CO_2 \leftrightarrow CaCO_3 + 2HCl + H_2O \quad [6]$$

$$2Ca(OH)_2 + 2HCl + CO_2 \leftrightarrow CaCO_3 + CaCl_2 + 3H_2O \quad [7]$$

$$HCl + Ca(OH)_2 \leftrightarrow CaOHCl + H_2O \quad [8]$$

$$HCl + CaOHCl + H_2 \leftrightarrow CaCl_2 + 2H_2O \quad [9]$$

$$SO_2 + CaOHCl + \tfrac{1}{2}H_2O \leftrightarrow CaSO_3 \cdot \tfrac{1}{2}H_2O + HCl. \quad [10]$$

At the reactor 2 the most of the HCl is removed, e.g. according to the reactions [2], [3], [7], [8], [9]; for example the amount of HCl removed from the flue gas can be greater than 95% by weight. In contrast, only a limited amount of SO$_2$ is removed at the reactor 2 according to the reactions [4], [10]; for example the amount of SO$_2$ removed from the flue gas at the reactor 2 can be lower than 70% by weight; for example in a plant burning waste material the amount of SO$_2$ removed from the flue gas can be lower than 70% and typically less than 50% by weight. At least the additional reactions [1], [5], [6] occur as well, even if not desired for HCl/SO$_2$ removal.

After reaction and HCl/SO$_2$ removal from the flue gas at the reactor 2, the flue gas FG containing the first dust products FDP comprising possible remainder of the reactive dust RD and the products formed during the reactions in the reactor 2 is forwarded to the pre-separator 3.

At the pre-separator 3 a part of the first dust products is removed. For example 50-99% by weight and preferably 70-99% by weight of the first dust products is removed, such that the flue gas FG forwarded from the pre-separator 3 to the separator 4 only contains a remainder of the first dust products being about 30-1% by weight of the first dust products FDP contained in the flue gas FG at the exit of the reactor 2.

Fresh reagent Ca(OH)$_2$ is thus added in the flue gas containing the reduced amount of first dust products. Since the fresh reagent is added into flue gas from which a large amount of first dust products has been removed, the fresh reagent is only diluted by the first dust products to a limited extent, such that the reactions with Ca(OH)$_2$ are very efficient.

The flue gas now containing the second dust products SDP (comprising the remainder of the first dust products FDP, the fresh reagent and the products of the reactions still occurring also thanks to the added fresh reagent) enters the fabric filter and is collected as dust cake 8 on the filter bags 9. On the filter bags 9 the second dust products SDP stay for some time, such that even the slower reactions can occur. For example, the reactions [4] and [10] mainly occur in the dust cake 8, such that the most of the SO$_2$ removal occurs at the fabric filter 4. It was found beneficial to have compounds containing Cl (such as CaOHCl) in the dust deposited on the filter bag 9, because they enhance SO$_2$ removal, for this reason at the pre-separator 3 the first dust products are not completely removed from the flue gas.

When discharged from the fabric filter 4 (for example during a scheduled cleaning cycle) the second dust products SDP are forwarded to the collector 6 where they are mixed with the part of the first dust products removed from the flue gas at the pre-separator 3; this mixture of dust is thus forwarded into the humidifier 5 where water H$_2$O is added to form the reactive dust RD that is supplied into the reactor 2.

All reactions [1]-[10] occur throughout the system comprising reactor 2, pre-separator 3, separator (fabric filter) 4, humidifier 5; the reactions [2], [3], [7], [8], [9] mainly occur in the reactor 2 and the HCl is mainly removed at the reactor 2, while the reactions [4], [10] mainly occur at the separator 4 and the SO$_2$ is mainly removed at the separator 4.

The amount of fresh reagent supplied via the supply 7 (and possibly via the additional supply, e.g. into the humidifier 5) can be regulated, e.g. via look up tables, in order to regulate the removal efficiency of HCl and/or SO$_2$.

The present invention also refers to a method for treatment of a flue gas containing HCl and SO$_2$.

The method comprises reacting in a reactor 2 at least a part of HCl and/or SO$_2$ contained in the flue gas FG with a reactive dust RD forming first dust products FDP, removing in a pre-separator 3 a part of the first dust products FDP from the flue gas FG and forwarding the flue gas containing a remainder of the first dust products FDP to a separator 4, e.g. a fabric filter, removing in the separator (e.g. fabric filter) the second dust products SDP from the flue gas FG, humidifying in a humidifier 5 at least the second dust products SDP forming the reactive dust RD, supplying the reactive dust RD to the reactor 2, supplying a pure fresh reagent such as Ca(OH)$_2$ into the flue gas FG after removing in the pre-separator 3 a part of the first dust products FDP from the flue gas FG and before or during removing in the fabric filter 4 the second dust products SDP from the flue gas, further reacting the HCl and/or SO$_2$ contained in the flue gas to obtain second dust products SDP.

In one embodiment supplying of the pure fresh reagent is made only after removing in the pre-separator 3 a part of the first dust products FDP from the flue gas FG and before or during removing the second dust products SDP from the flue gas in the fabric filter (i.e. not in other parts of the system). Alternatively fresh reagent can also be supplied into the humidifier 5 or another part of the system.

Preferably, at the pre-separator 50-99% by weight and preferably 70-99% by weight of the first dust products FDP is removed from the flue gas; this way some of the first dust products FDP containing CaOHCl is left in the flue gas to help the reactions (CaOHCl in very efficient in removing HCl and $SO_2$).

The removal rate of the first dust products between 50-99% by weight and preferably 70-99% can be adjusted in different ways. For example, the removal rate of the first dust products from the flue gas can be adjusted:

- on the basis of the required $SO_2$ removal rate and/or on the basis of a parameter indicative of the required $SO_2$ removal rate; this parameter could be e.g. the $SO_2$ actual content in the flue gas, the difference between the $SO_2$ actual content in the flue gas and a reference $SO_2$ content value, the final $SO_2$ amount in the flue gas downstream of the system, etc;
- on the basis of the required HCl removal rate and/or on the basis of a parameter indicative of the required HCl removal rate; this parameter could be e.g. the HCl actual content in the flue gas, the difference between the HCl actual content in the flue gas and a reference HCl content value, the final HCl amount in the flue gas downstream of the system, etc;
- the CaOHCl content in the first and/or second dust products and/or on the basis of a parameter indicative of the CaOHCl content in the first and/or second dust products; this parameter could be e.g. the CaOHCl actual content in the first and/or second dust products, the difference between the CaOHCl actual content in the first and/or second dust products and a reference CaOHCl content value, etc;
- a Cl total content in the first and/or second dust products (this total content comprising the content of the compounds comprising Cl, such as HCl, CaOHCl, $CaCl_2$, etc.) or a parameter indicative of the Cl total content in the first and/or second dust products,
- the amount of fresh reagent supplied via the supply 7 or a parameter indicative thereof.

The removal rate of the first dust products at the pre-separator 3 can e.g. be regulated using adjustable cyclones, as known in the art.

Naturally the features described may be independently provided from one another.

In practice the materials used and the dimensions can be chosen at will according to requirements and to the state of the art.

The invention claimed is:

1. A flue gas treatment system for a flue gas containing HCl and $SO_2$, the system comprising:
   a reactor;
   a pre-separator downstream of the reactor;
   a separator downstream of the pre-separator;
   a humidifier downstream of the separator and connected to the reactor;
   a supply of a pure fresh reagent into the flue gas downstream of the pre-separator and upstream of or at the separator; and
   a collector connected to the pre-separator and to the separator and to the humidifier.

2. The system of claim 1, wherein the collector is operable for mixing second dust products with a part of first dust products removed at the pre-separator for supply of this mixture to the humidifier.

3. The system of claim 1, wherein the supply is only provided downstream of the pre-separator and upstream of or at the separator.

4. The system of claim 1, wherein the separator comprises a fabric filter.

5. The system of claim 1, wherein the pre-separator is operative to remove from the flue gas between 50-99% by weight and preferably 70-99% by weight of first dust products.

6. The system of claim 1, wherein the pre-separator includes a cyclone.

7. The system of claim 1, wherein the pre-separator includes an adjustable cyclone.

8. The system of claim 1, wherein the reactor is arranged for reacting at least a part of HCl and/or $SO_2$ contained in the flue gas with a reactive dust forming first dust products, the pre-separator is arranged for removing a part of the first dust products from the flue gas and forwarding the flue gas containing a remainder of the first dust products to the separator, the separator is arranged for further reacting the HCl and/or $SO_2$ contained in the flue gas to contribute to generate second dust products and for removing the second dust products from the flue gas, the humidifier is arranged for humidifying the second dust products forming reactive dust and supplying the reactive dust to the reactor.

9. A method for treatment of a flue gas containing HCl and $SO_2$, the method comprising:
   reacting in a reactor at least a part of HCl and/or $SO_2$ contained in the flue gas with a reactive dust forming first dust products;
   removing in a pre-separator a part of the first dust products from the flue gas and forwarding the flue gas containing a remainder of the first dust products to a separator;
   removing in the separator second dust products from the flue gas;
   humidifying in a humidifier the second dust products forming the reactive dust;
   supplying the reactive dust to the reactor;
   supplying a pure fresh reagent into the flue gas after removing in a pre-separator and before or during removing in the separator, and then further reacting the HCl and/or $SO_2$ contained in the flue gas to obtain the second dust products; and
   mixing in a collector connected to the pre-separator and to the separator and to the humidifier, the second dust products with the part of the first dust products removed at the pre-separator for supply of this mixture to the humidifier.

10. The method of claim 9, wherein the humidifier includes a water supply.

11. The method of claim 9, further comprising supplying the pure fresh reagent only after removing in a pre-separator and before or during removing in the separator.

12. The method of claim 9, wherein the separator comprises a fabric filter.

13. The method of claim 9, further comprising removing from the flue gas, at the pre-separator, between 50-99% by weight and preferably 70-99% by weight of the first dust products.

14. The method of claim 9, further comprising removing from the flue gas, at the pre-separator, between 50-99% by weight and preferably 70-99% by weight of the first dust products, and adjusting the amount of first dust products that is removed from the flue gas on the basis of:
- a required $SO_2$ removal rate or a parameter indicative thereof, and/or
- a required HCl removal rate or a parameter indicative thereof, and/or
- a CaOHCl content in the first and/or second dust products or a parameter indicative thereof, and/or
- a Cl total content in the first and/or second dust products or a parameter indicative thereof, and/or
- an amount of fresh reagent supplied via the supply or a parameter indicative thereof.

15. The method of claim 9, wherein the pre-separator includes a cyclone.

* * * * *